(No Model.)
J. D. IHLDER.
ELECTRIC MOTOR.
No. 514,077. Patented Feb. 6, 1894.
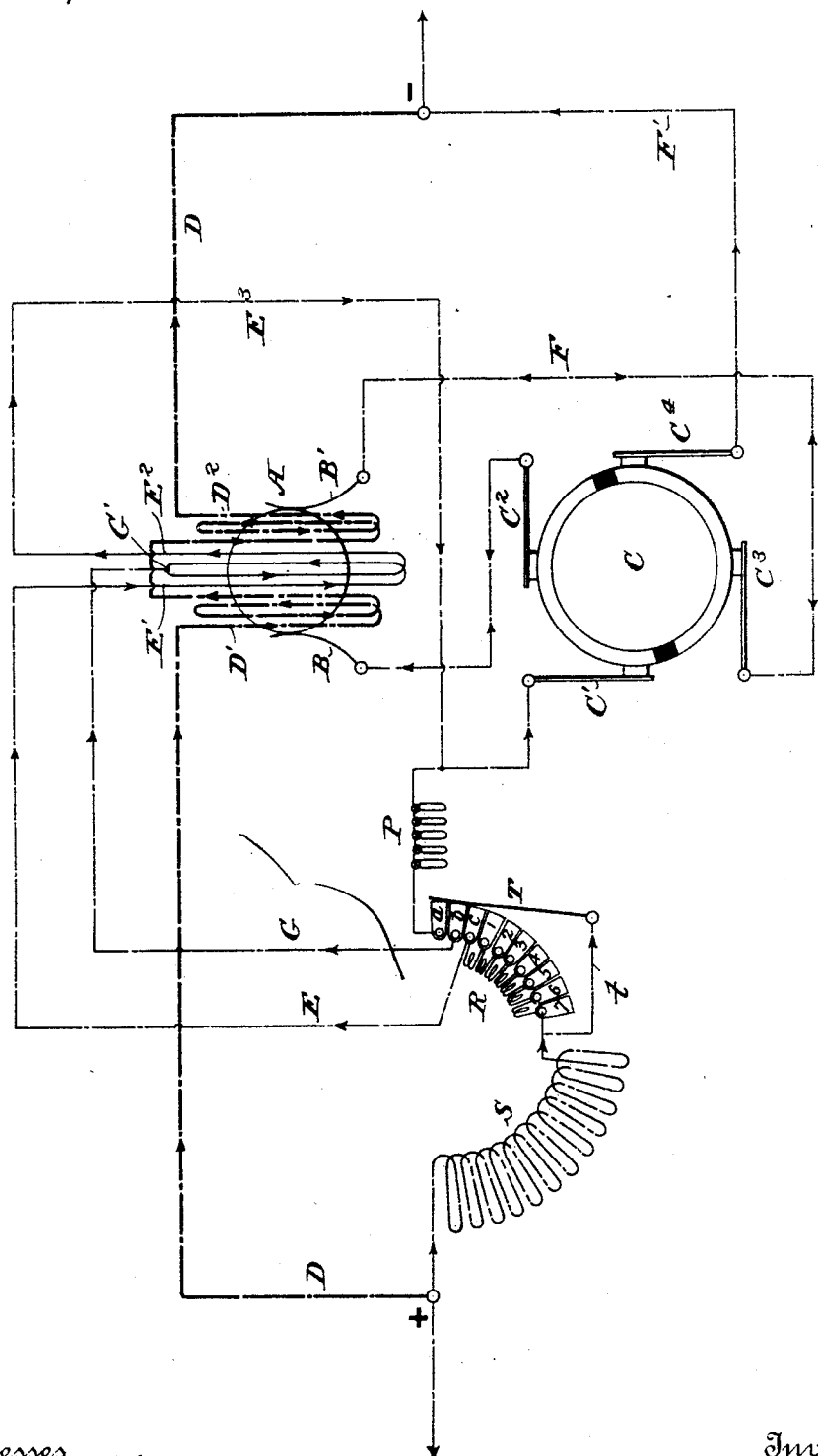
Witnesses
Jno. G. Hinkel
A. N. Dobson
Inventor
John D. Ihlder
by
Faster Freeman
Attorneys

UNITED STATES PATENT OFFICE.

JOHN D. IHLDER, OF YONKERS, ASSIGNOR TO THE OTIS BROTHERS & COMPANY, OF NEW YORK, N. Y.

ELECTRIC MOTOR.

SPECIFICATION forming part of Letters Patent No. 514,077, dated February 6, 1894.

Application filed September 29, 1893. Serial No. 486,807. (No model.)

*To all whom it may concern:*

Be it known that I, JOHN D. IHLDER, a citizen of the United States, residing at Yonkers, Westchester county, State of New York, have invented certain new and useful Improvements in Parallel Resistance Series Field Motors, of which the following is a specification.

My invention relates to means for starting and operating electric motors, and while my invention may be employed in many and various connections, it has special reference to the employment of electric motors in operating elevators and the like, and the object is to provide means whereby the motor may be started and operated without danger and may be controlled so that the elevator or other appliance connected thereto will be operated uniformly and satisfactorily under all conditions, and to these ends my invention consists in the features of construction and arrangement having the mode of operation, substantially as hereinafter more particularly pointed out.

In the accompanying drawing the figure is a schematic representation of a motor and attachments and arrangements of circuits embodying my invention sufficient to enable those skilled in the art to understand the same.

In the use of what are generally termed compound electric motors, especially in connection with elevators and the like, it is well known that they have many advantages in many respects, and are still open to objection in other respects, and many inventions have been made in order to adapt such motors for this work, so that the advantageous features may be utilized, while the disadvantageous features may be overcome, and my invention relates to such an arrangement and construction of the motor and connected electric circuits that this result shall be attained to a high degree.

It is desirable to utilize the compound motor in starting a load, as for instance an elevator, in order to overcome its inertia in the best and most economical manner, and after the motor has started and practically attained its normal speed, it is desirable to operate the motor as practically a shunt wound motor, as such a motor is found to be best adapted for this purpose, running at a uniform rate of speed and being practically self-regulating and most economical, and I will now describe the arrangement illustrated in the drawing whereby I carry out my present improvements.

In the drawing A, represents the armature of the motor, B, B', the brushes of the motor, the field magnet coils being indicated as wound on the motor in the manner hereinafter described, while C, is a circuit reverser for the armature, they being shown displayed for convenience of illustration.

The characters plus and minus represent the lead or main lines of an electric circuit supplying current to the motor, and the conductor D, shown in the heavy lines, including the convolutions D', $D^2$, represents the long shunt field magnet coils of a compound wound motor.

The armature circuit which normally includes the series field magnet coils is provided with what is termed in the art as an auxiliary resistance R, which is preferably controlled by an electro-magnetic device S, which is included in the armature circuit and which controls a contact arm T, which bears on the various contact plates of the auxiliary resistance R. One end of this auxiliary resistance, as the block 7, is connected to the coil S, and to the next succeeding block 6, by a resistance $r$, and the blocks 6 and 5, and 5 and 4, &c., are similarly connected by suitable resistances. The block $c$, is connected by a conductor E, with the series field magnet coils E', $E^2$, of the motor and thence leading from said coils by the conductor $E^3$, the circuit passes to the contact arm C', of the circuit reversers C, thence to the contact arm $C^2$, thence passes to the brush B, of the armature through the coils thereof to brush B', thence by the conductor F, to the contact arm $C^3$, and out by the contact arm $C^4$, by the conductor F', to the main line. Of course if the position of the current reverser C, is changed the current will be the same, except that it will pass through the armature coils in the opposite direction in a manner well understood.

The contact block $b$, of the auxiliary resistance is shown as connected by the conductor G, with the central portion G', of the series field magnet coils of the motor, so that only one-half of those coils are included in the circuit of this contact block.

The contact block a, is connected by what I term a parallel resistance P, with the contact arm C', of the current reverser. This parallel resistance is arranged to be adjustable, as indicated by means of plugs or other suitable and well known devices, so that it may be adapted to offer the proper resistance in accordance with the load of the elevator or work being done by the motor, and it will be seen that this resistance is in multiple arc or parallel with the series field magnet coils, or a portion thereof, as the case may be and as hereinafter explained. With this arrangement of circuits it will be seen that when the circuit is closed through the motor, which may be by the well known switch devices, a portion of the current goes to the conductor D, including the shunt field magnet coils of the motor, while another portion passes through the coils of the electro-magnetic device S, energizing the same and operating to cause the contact arm T, to assume a position so that it will bear on the contact block 7, and include the auxiliary resistance in the armature circuit thereby preventing damage thereto, or too great a flow of current through the armature on starting, and it will be observed also that the current after passing through the resistance also passes through the conductor E, including the series field magnet coils of the motor, thereby causing it to operate as a compound motor for the purpose of getting the greatest torque in starting, and overcoming the inertia of the load. As soon however, as the armature of the motor begins to operate the counter electro-motive force tends to reduce the amount of current flowing through the armature, weakening the coils of the electro-magnetic device S, and the auxiliary resistances are gradually cut out of circuit, the contact arm passing over the successive contact blocks in a manner well understood. When the contact arm reaches the block c, all of the auxiliary resistance is cut out of or short circuited from the armature circuit and the series field magnet coils are all included therein. When the contact arm reaches the block b, it will be seen that a portion only of the series field magnet coils of the motor are included in the armature circuit, the remainder of the coils being short circuited, and when the contact arm reaches the block a and remains on the two blocks a and b, which is at the end of its movement, it will be seen that the parallel resistance P, is included in multiple circuit with a portion of the series field magnet coils connected with the conductor G, and the current will consequently divide between these field magnet coils and the parallel resistance in reverse ratio to their relative resistances, and under these conditions the motor is supposed to operate in its normal condition. By varying the parallel resistance P, the current passing thereto and through a portion of the series field magnet coils is regulated according to the load which the motor is adapted to normally carry.

In starting the motor as a compound wound motor and then operating it in its normal condition it is found to be desirable to retain some current in the series field magnet coils in order to reduce the sparking between the contact plates and brushes which takes place when the series field magnet coils are entirely and suddenly cut out and into circuit with a heavy load on the armature, but the motor operates practically as an ordinary shunt wound motor, only sufficient current passing through the series field magnet coils to prevent the disadvantages before set forth, the main portion of the current preferably passing through the parallel resistance P, and then to the armature and as before indicated this parallel resistance may be adjusted so as to regulate the speed of the motor under any given load.

While I have thus illustrated and described the principles of my invention, it will be understood of course that I do not limit myself to any particular construction or arrangement of specific devices, whereby they may be carried out, as they can be readily adapted and arranged by those skilled in the art in various ways without departing from the spirit of my invention, and while the motor thus arranged is intended to be principally used for operating elevators and the like, which have to start and stop at frequent intervals, it will be understood that it may be used in other connections with equal advantage.

What I claim is—

1. A compound wound electric motor having a shunt field magnet coil connected to the terminals of the supply circuit, a series field magnet coil included in the armature circuit, and a resistance arranged in parallel with the series field magnet circuits, substantially as described.

2. A compound wound electric motor for elevators having a shunt including the field magnet coils and connected to the terminals of the supply circuit, a series field magnet circuit in one or more sections included in the armature circuit, a resistance in parallel with one of the sections of the series field magnet coils, and means for controlling the circuits, substantially as described.

3. A compound wound electric motor for elevators having a shunt including the field magnet coils and connected to the terminals of the supply circuit, a series field magnet coil in sections included in the armature circuit, an adjustable resistance arranged in parallel with the series field magnet coils, an auxiliary resistance arranged in the armature circuit, and means for controlling the auxiliary resistance, the series field magnet and the parallel resistance, substantially as described.

4. A compound wound electric motor for elevators having a shunt including field magnet coils and connected to the terminals of the supply circuit, a series field magnet coil in sections included in the armature circuit, a resistance arranged in parallel with one section of the series field magnet coils, an auxiliary resistance in the armature circuit, and an electro-magnetic device controlling said auxiliary resistance and the series field magnet coils and the parallel resistance circuits, substantially as described.

In testimony whereof I have signed my name to this specification in the presence of two subscribing witnesses.

JOHN D. IHLDER.

Witnesses:
 JAMES S. FITCH,
 FREDERICK E. HUBBELL.